Patented Jan. 19, 1926.

1,570,080

UNITED STATES PATENT OFFICE.

ROSCOE R. STITT, OF MARQUETTE, MICHIGAN.

REFRIGERANT.

No Drawing.  Application filed February 2, 1925.  Serial No. 6,449.

*To all whom it may concern:*

Be it known that I, ROSCOE R. STITT, a citizen of the United States, residing at Marquette, in the county of Marquette and State of Michigan, have invented certain new and useful Improvements in Refrigerants, of which the following is a specification.

This discovery relates to a refrigerant; especially a refrigerant for use in the expansion type of refrigerating system. Various forms of refrigerants have heretofore been used, such as ammonia, sulphur dioxide, gasoline, and methyl chloride. These are objectionable for various reasons. For instance, ammonia gas and sulphur dioxide gas have a relatively low specific density; that is, the gases are rarer than methyl chloride and consequently it takes a relatively large compressor to handle the same amount (in weight) of the refrigerant. In small domestic refrigerating units, it is desirable to keep the compressor as small as possible.

Sulphur dioxide, which is one of the most common refrigerants used in domestic units, is poisonous, odoriferous, and must be very securely packed against both escape of the gases and also to prevent moisture getting into the system. If moisture gets in it may form sulphuric acid, which is extremely corrosive, attacking the metal parts and often making some of the moving parts freeze or stick.

It is the object of the present discovery to afford a refrigerant which has all the advantages of methyl chloride without many of its disadvantages, and which is more desirable than sulphur dioxide, ammonia, gasoline, etc., by reason of eliminating some of the characteristics which make these refrigerants objectionable.

I have discovered that a refrigerant made up of 97½% methyl chloride, ($CH_3Cl$) and 2½% methyl alcohol, ($CH_3OH$—wood alcohol) has very striking properties which make it very much more desirable than methyl chloride. For instance, at relatively low temperatures, as at 5 to 10 below zero, Fahrenheit, methyl chloride tends to crystallize or form a sort of slush. This prevents it readily passing through the expansion valve port, and introduces difficulties in using methyl chloride as a refrigerant where relatively low temperatures are desired, as in an ice cream apparatus.

Furthermore, I find that the above described refrigerant is slightly more volatile than plain methyl chloride. From my present information, such a refrigerant boils under ordinary pressures at minus 16 degrees Fahrenheit.

Furthermore, I find that the latent heat absorbed by my refrigerant in changing from the liquid to the gaseous form is very much more than methyl chloride.

I am advised that methyl chloride absorbs approximately .122 B. t. u.'s per pound, while my refrigerant absorbs .248 B. t. u.'s per pound. This is considerably higher than sulphur dioxide, which absorbs about .144.

A still further very important feature is that for some unexplained reason it appears that the lubricant goes into solution, or emulsion, with plain methyl chloride so as to completely lose its lubricating properties, and hence lubricant in the gas can in no way lubricate the compressor. However, with my refrigerant, I find that the lubricant remains in suspension in the liquid and can be carried into the compressor with substantially all its lubricating properties.

I further find that my refrigerant permits the operation of apparatus having at least 2% moisture in the system without impairing the operation to any material extent. As explained already, moisture getting into sulphur dioxide may result in sulphuric acid, which corrodes the parts. When moisture gets into the methyl chloride it freezes around the expansion valve and makes trouble. With the use of my refrigerant, the alcohol appears to lower the freezing point of any moisture so as to prevent its freezing in the expansion valve. It only freezes after it has been carried through the expansion valve into the gas chamber, where the temperature is much lower. Here no particular difficulty will be experienced due to the moisture freezing out.

Still another advantage that I find is that my refrigerant has, under tests, liquefied at a pressure of about 45 pounds at 60 degrees temperature, while similar tests have required 70 pounds pressure at 60 degrees for plain methyl chloride. This is obviously a distinct advantage.

I find for the most advantageous operation that the proportions should be those indicated above, and that the methyl alcohol (wood alcohol) should be absolute,—that is, it should not have more than 1/10 of 1% adulterant. I have also found that a variation either way from the above formula materially decreases its properties, but I do not desire to be limited to substantially these exact proportions, but desire it understood that measurably good results can be obtained with some variation.

What I claim is:

1. A new product for use as a refrigerant or similar purposes, comprising methyl-chloride and methyl-alcohol.

2. A new product for use as a refrigerant or similar purposes, comprising substantially 97½% of methyl-chloride and 2½% of methyl-alcohol.

3. A new product for use as a refrigerant or similar purposes, comprising a relatively great amount of methyl-chloride and a relatively small amount of methyl-alcohol absolute.

4. A new product for use as a refrigerant or similar purposes, comprising a relatively great amount of methyl-chloride and a relatively small amount of alcohol.

In testimony whereof I have affixed my signature.

ROSCOE R. STITT.

(wood alcohol) should be absolute,—that is, it should not have more than 1/10 of 1% adulterant. I have also found that a variation either way from the above formula materially decreases its properties, but I do not desire to be limited to substantially these exact proportions, but desire it understood that measurably good results can be obtained with some variation.

What I claim is:

1. A new product for use as a refrigerant or similar purposes, comprising methyl-chloride and methyl-alcohol.

2. A new product for use as a refrigerant or similar purposes, comprising substantially 97½% of methyl-chloride and 2½% of methyl-alcohol.

3. A new product for use as a refrigerant or similar purposes, comprising a relatively great amount of methyl-chloride and a relatively small amount of methyl-alcohol absolute.

4. A new product for use as a refrigerant or similar purposes, comprising a relatively great amount of methyl-chloride and a relatively small amount of alcohol.

In testimony whereof I have affixed my signature.

ROSCOE R. STITT.

Certificate of Correction.

It is hereby certified that in Letters Patent No. 1,570,080, granted January 19, 1926, upon the application of Roscoe R. Stitt, of Marquette, Michigan, for an improvement in "Refrigerants," an error appears in the printed specification requiring correction as follows: Page 2, line 2, for "1/10 of 1%" read *1/100 of 1%;* and that the said Letters Patent should be read with this correction therein that the same may conform to the record of the case in the Patent Office.

Signed and sealed this 30th day of November, A. D. 1926.

[SEAL.]
M. J. MOORE,
*Acting Commissioner of Patents.*

Certificate of Correction.

It is hereby certified that in Letters Patent No. 1,570,080, granted January 19, 1926, upon the application of Roscoe R. Stitt, of Marquette, Michigan, for an improvement in "Refrigerants," an error appears in the printed specification requiring correction as follows: Page 2, line 2, for "1/10 of 1%" read *1/100 of 1%;* and that the said Letters Patent should be read with this correction therein that the same may conform to the record of the case in the Patent Office.

Signed and sealed this 30th day of November, A. D. 1926.

[SEAL.]

M. J. MOORE,
*Acting Commissioner of Patents.*